(12) United States Patent
Horvitz et al.

(10) Patent No.: US 6,505,167 B1
(45) Date of Patent: Jan. 7, 2003

(54) SYSTEMS AND METHODS FOR DIRECTING AUTOMATED SERVICES FOR MESSAGING AND SCHEDULING

(75) Inventors: Eric Horvitz, Kirkland, WA (US); Andrew W. Jacobs, Seattle, WA (US)

(73) Assignee: Microsoft Corp., Redmond, WA (US)

( * ) Notice: Subject to any disclaimer, the term of this patent is extended or adjusted under 35 U.S.C. 154(b) by 0 days.

(21) Appl. No.: 09/295,146

(22) Filed: Apr. 20, 1999

(51) Int. Cl.[7] ................................................. G06F 17/60
(52) U.S. Cl. ........................................................ 705/9
(58) Field of Search ........................... 705/8, 9; 345/963

(56) References Cited

U.S. PATENT DOCUMENTS

| | | | | |
|---|---|---|---|---|
| 5,212,791 A | * | 5/1993 | Damian et al. ............. 709/226 |
| 5,960,406 A | * | 9/1999 | Rasansky et al. ............... 705/9 |
| 5,963,913 A | * | 10/1999 | Henneuse et al. .............. 705/9 |
| 6,016,478 A | * | 1/2000 | Zhang et al. ................... 705/9 |
| 6,035,278 A | * | 3/2000 | Mansour ......................... 705/9 |
| 6,038,542 A | * | 3/2000 | Ruckdashel .................... 705/9 |
| 6,064,976 A | * | 5/2000 | Tolopka .......................... 705/9 |
| 6,094,681 A | * | 7/2000 | Shaffer et al. ............... 709/224 |
| 6,101,480 A | * | 8/2000 | Conmy et al. ................... 705/9 |
| 6,144,942 | * | 11/2000 | Ruckdashel .................... 705/9 |
| 6,216,110 | * | 4/2001 | Silverberg ..................... 705/9 |
| 6,237,027 | * | 5/2001 | Namekawa .................. 709/226 |

OTHER PUBLICATIONS

Erin "Return to Sender" PC Week, v14, n30, p111(2); Dialog file 47, Accession No. 04782742. Jul. 1997.*

\* cited by examiner

*Primary Examiner*—Kyle J. Choi
*Assistant Examiner*—Romain Jeanty
(74) *Attorney, Agent, or Firm*—Amin & Turocy, LLP

(57) ABSTRACT

Directing automated services for messaging and scheduling. In one embodiment, a computer-implemented method first determines a message to analyze. The method then determines the probability that the user would like to review a calendar or to schedule an appointment based on information in the message, based on the message, and based on the scheduling probability, selects one of the following options: (1) inaction, (2) automatic action, or (3) suggested action with user approval. Upon the method selecting either the (1) automatic action option or the (2) suggested action with user approval option—the latter also in conjunction with receiving actual user approval—the method performs a scheduling action based on the message in a manner that takes into consideration the precision and confidence of the scheduling action.

32 Claims, 9 Drawing Sheets

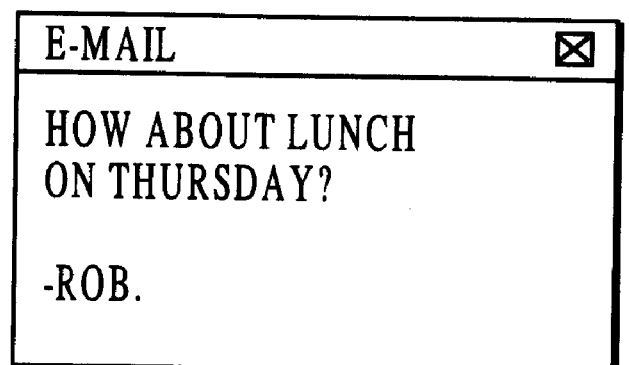
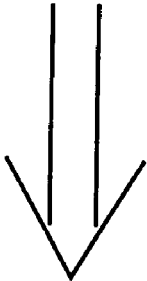
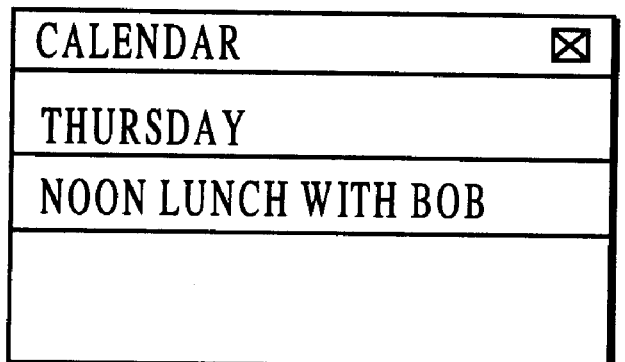
FIG. 2

FIG. 6

| | |
|---|---|
| GOOD TIME | A MEETING |
| ARE YOU | LOOKING FORWARD TO |
| CONFERENCE ROOM | SCHEDULE LOOK |
| CONF. ROOM | LET'S MEET |
| ARRANGE A ROOM | LETS MEET |
| ARRANGE A LOCATION | WHEN IS |
| SCHEDULE A MEETING | WHERE SHOULD |
| HOW WOULD THAT BE | THE MEETING |
| HOW WOULD | WE SHOULD |
| GOOD TIME | WHY DON'T WE |
| SEE YOU THEN | WHY DONT WE |
| TO GO OVER | WE NEED TO |
| SHUTTLE OVER | I NEED TO |
| DO IT WHEN | IMMEDIATE ACTION |
| MEETING WAS USEFUL | NOT CRITICAL |
| MEETING WENT WELL | AS SOON AS POSSIBLE |
| STARTING AT | RIGHT AWAY |
| TOMORROW AFTERNOON | ASAP |
| TOMORROW MORNING | AVAILABLE IMMEDIATELY |
| TOMORROW EVENING | TOGETHER SOON |
| MEET NEXT WEEK | I NEED |
| NEXT COUPLE OF WEEKS | REALLY IMPORTANT |
| SEE YOU SOON | CANNOT WAIT |
| HOW DOES THIS | IS CRITICAL |
| TO MEET | HAS TO |
| ARE YOU FREE | MUST HAPPEN |
| CAN WE RESCHEDULE | VERY COSTLY |
| HAS BEEN RESCHEDULED | CANNOT DELAY |
| SCHEDULE PLUS | TIME CRITICAL |
| S+ | LITTLE TIME |
| SCHEDULE+ | SHOULD NOT WAIT |
| HAS BEEN CANCELLED | BETTER DO THIS |
| WHEN CAN WE | VERY BADLY |
| WHAT TIME | BE LATE |
| MEETING AT | CARE OF THIS |
| MEETING WILL BE AT | WILL YOU |
| HOW ABOUT | CANNOT FIND |
| SEE YOU | CANNOT DO |
| THE DEADLINE IS | NEED YOU |
| YOUR SCHEDULE | NEED YOUR |
| GET TOGETHER | HOW SOON |
| GETTING TOGETHER | DON'T MISS |
| LUNCH? | SHOULDN'T MISS |
| GET LUNCH | MUST SCHEDULE |
| NEXT WEEK | NOT A BIG DEAL |
| THIS WEEK | LOW PRIORITY |
| WHEN WOULD BE | HIGH PRIORITY |
| MEET WITH YOU | DON'T BOTHER |
| WHEN CAN WE MEET | DON'T WORRY |
| MEET FOR | NOT TO WORRY |
| HOW ABOUT MEETING | WORRIED ABOUT |
| SCHEDULE LOOK LIKE | VERY WORRIED |
| SCHEDULE LOOKS LIKE | VERY LATE |
| MY SCHEDULE | DEADLINE IS |
| YOUR SCHEDULE | COMPLETE BY |
| SCHEDULED FOR | CAN WAIT |
| HAS BEEN SCHEDULED | PUT THIS OFF |
| MEETING ON | GET THIS DONE |
| MEETING AT | VERY FRUSTRATED |
| LAST WEEK | MEET SOON |
| MEETING YESTERDAY | SEE YOU IMMEDIATELY |
| YESTERDAY'S MEETING | AS POSSIBLE |
| WHEN WOULD | FAST AS |
| WOULD YOU LIKE | AS FAST |

SYSTEMS AND METHODS FOR DIRECTING AUTOMATED SERVICES FOR MESSAGING AND SCHEDULING

RELATED APPLICATIONS

This application is related to the coassigned and cofiled applications entitled "A Decision-Theoretic Approach to Harnessing Text Classification for Guiding Automated Action" U.S. patent application Ser. No. 09/295,088, and "Learning by Observing a User's Activity for Enhancing the Provision of Automated Services" U.S. patent application Ser. No. 09/295,077, both of which are hereby incorporated by reference.

FIELD OF THE INVENTION

This invention relates generally to messaging and scheduling, and more particularly to directing automated services for messaging and scheduling.

BACKGROUND OF THE INVENTION

Messaging and scheduling have become important applications in many computer users' lives. Messaging programs generally allow a user to send and receive electronic mail (e.g., messages) to and from other computer users, for example, over a local- or a wide-area network, or over an intranet, extranet, or the Internet. Scheduling programs generally allow a user to track appointments in a calendar. More sophisticated scheduling programs allow one user to schedule a group meeting with other computer users—checking the latter users' schedule availability, and receiving confirmation from the users upon them accepting or rejecting the group meeting appointment.

Within the prior art, however, messaging and scheduling programs are generally not very well integrated, even if they are components within the same computer program. For example, a user may receive a message from a colleague stating "Looking forward to seeing you at 2 on Thursday." Generally, however, the prior art does not provide for automatically directing the scheduling program to make a meeting appointment at 2 p.m. on Thursday. Instead, typically the user who has received the message has to open the scheduling program, access Thursday's calendar, and manually enter an appointment at 2 p.m. on Thursday's calendar. Because of the many steps required to go from reading the message within the messaging program to entering the information into the scheduling program, many users choose not to even use scheduling programs, or to only use them sparingly.

For these and other reasons, there is a need for the present invention.

SUMMARY OF THE INVENTION

The invention relates to directing automated services for messaging and scheduling. In one embodiment, a computer-implemented method first determines a message to analyze. The method then determines a scheduling probability (which in one embodiment is an inferred probability that the user has a goal of scheduling and/or reviewing calendar information) based on at least one of the message and contextual information (e.g., information regarding recent user activity), and based on the scheduling probability, selects one of the following options: (1) inaction, (2) automatic action, or (3) suggested action pending user approval (the latter of which may include a dialog with the user about desirability of the automatic action, or may include seeking confirmation from the user to take action). Upon the method selecting either the (1) automatic action option or the (2) suggested action with user approval option—the latter also in conjunction with receiving actual user approval—the method performs a scheduling action based on the message in a manner balancing precision and confidence of the scheduling action.

Embodiments of the invention provide for advantages not found within the prior art. The method can perform a scheduling action based on the message, upon determining the scheduling probability of the message. Based on the scheduling probability—defined in one embodiment as the probability a user desires to view a calendar or to schedule an appointment given the information in an email message or other source of text-based information.—the method determines if it should do nothing (i.e., corresponding to a low probability), do something automatically (i.e., corresponding to a high probability), or suggest an action, but do not do it automatically (i.e., corresponding to a medium probability). Thus, embodiments of the invention effectively link scheduling with messaging automatically, when a message has scheduling information contained therein.

Furthermore, by performing the scheduling action in a manner balancing precision and confidence of the scheduling action, embodiments of the invention are also advantageous. In one embodiment, the scheduling action performed only has a precision level commensurate with the method's confidence that the action is correct. Thus, if the method can only glean that an appointment is to fall on Thursday, but cannot determine what time on Thursday, the method shows the user all of Thursday's calendar. As another example, if the method can only glean that an appoint is to fall sometime next week, but cannot determine what day next week, the method shows the user all of next week's calendar. In other words, in one embodiment of the invention, the method performs a scheduling action only insofar as it is certain to a predetermined degree of confidence that the scheduling action is correct, instead of performing a far more precise scheduling action that it is not as certain is correct.

The invention includes computer-implemented methods, machine-readable media, computerized systems, and computers of varying scopes. Other aspects, embodiments and advantages of the invention, beyond those described here, will become apparent by reading the detailed description and with reference to the drawings.

BRIEF DESCRIPTION OF THE DRAWINGS

FIG. 2 is a diagram of an example of directed scheduling, according to an embodiment of the invention;

FIG. 6 is a table of phrases that can be utilized in conjunction with embodiments of the invention;

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Operating Environment

Figure 1:
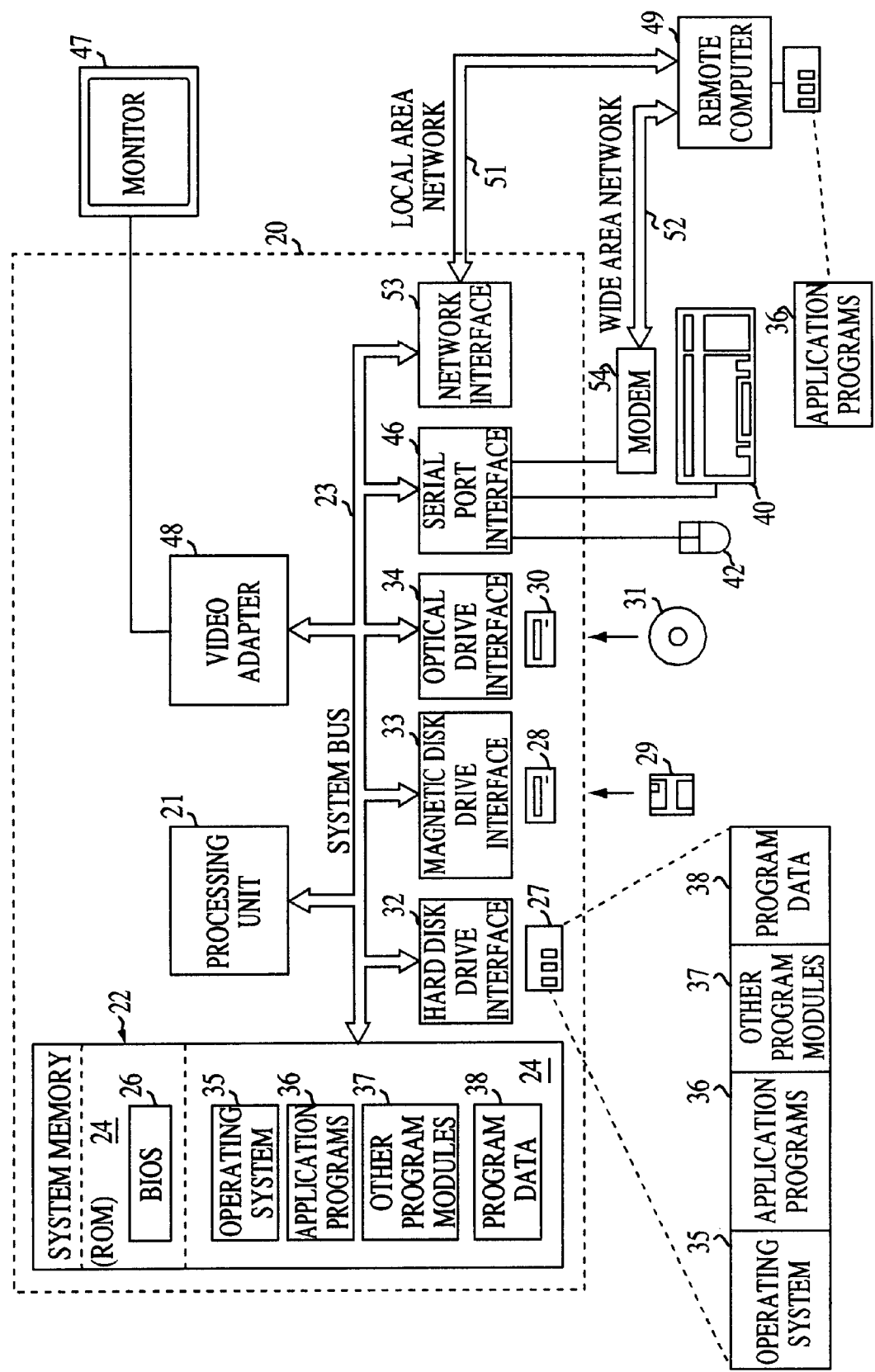
FIG. 1 is a diagram of an operating environment in conjunction with which embodiments of the invention can be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device.

The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internal. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

Illustrative Example

Prior to describing methods and systems of embodiments of the invention, an illustrative example according to an embodiment of the invention is first described in this section of the detailed description, with reference to FIG. 2. As stated in the summary, embodiments of the invention relate to directing automated services for messaging and scheduling. Thus, in the example of FIG. 2, an electronic mail is shown in a window 200. The window 200 may be part of an electronic mail program, such as those available within the art. The electronic mail has the text, from a user named Bob, reading "How about lunch on Thursday?". In one embodiment of the invention, a window 202 of the scheduling program appears, such as scheduling programs available within the art. The embodiment of the invention causes a scheduling entry to be entered in the user's calendar for Thursday, at noon, reading "Lunch with Bob."

In other words, the embodiment of the invention determines the scheduling probability of the electronic mail in the in the window 200, and makes a decision for automatic scheduling based on the probability of the message. It then performs a scheduling action—parsing the text of the electronic message, and entering the entry in the scheduling program as is shown in the window 202. Thus, the embodiment of the invention is able to recognize that "Lunch" means about noon in time, and that "lunch on Thursday" in general has a high scheduling probability (that is, a high probability that the electronic mail relates to a scheduling task).

Those of ordinary skill within the art can appreciate that the example of FIG. 2 is meant only to illustrate how embodiments of the invention can operate, for purposes of understanding operation of embodiments of the invention, and does not represent limitations of the invention itself.

Methods

In this section of the detailed description, computer-implemented methods according to varying embodiments of the invention are described. The computer-implemented methods are desirably realized at least in part as one or more programs running on a computer—that is, as a program executed from a computer-readable medium such as a memory by a processor of a computer. The programs are desirably storable on a machine-readable medium such as a floppy disk or a CD-ROM, for distribution and installation and execution on another computer.

Figure 3:
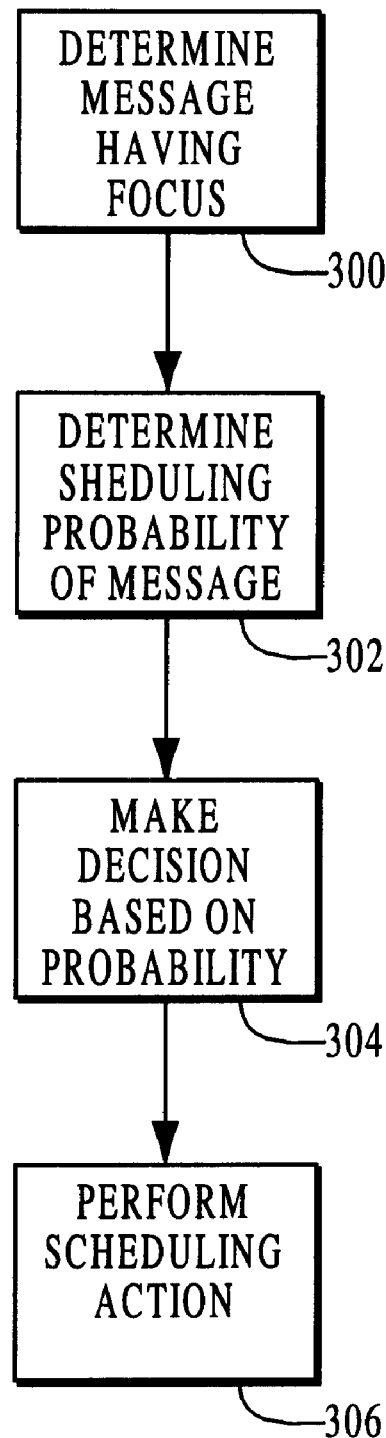
FIG. 3 is a flowchart of a method according to an embodiment of the invention.

A general method of an embodiment of the invention is first described in conjunction with FIG. 3, which is a flowchart of a method according to an embodiment of the invention. In 300, the method specifically determines which message currently has focus; more generally, the method determines a message to analyze. A message having focus is the message of the window that is currently open within a graphical user interface operating system. For example, ten windows may be open on the screen, such that each window has an electronic mail message therein. The window that is currently selected by the user is the window that is currently active, and thus the window that has focus. It is this window that the method selects in 300.

In 302, the method next determines a scheduling probability based on the message. The scheduling probability of the message generally refers to the probability that the message relates to a scheduling task. For example, in general, a message reading "Good luck, Bob, on your new venture" has a low scheduling probability, since it does not have subject matter relating to a scheduling task. Conversely, for example, in general, a message reading "The next departmental meeting will be held at 5 P.M. on October 23" has a high scheduling probability, since it does have subject matter relating to a scheduling task.

In other words, the scheduling probability of a message is the probability that the user's goal for the message is to perform a scheduling action based on the message. In one embodiment of the invention, the scheduling probability is determined in 302 by passing the message as input to a model such as a text classification system or a support vector machine classifier, as are known within the art. In particular, in one embodiment of the invention, the model utilized is as described in U.S. Pat. No. 5,864,848, issued Jan. 26, 1999, which is hereby incorporated by reference. In another embodiment of the invention, the model utilized is as described in the previously filed and coassigned case entitled "METHODS AND APPARATUS FOR BUILDING A SUPPORT VECTOR MACHINE CLASSIFIER," Ser. No. 09/055,477, filed on Apr. 6, 1998, which is also hereby incorporated by reference. In addition, further information regarding the training of these models for the particular application in this case is later described in this application.

Once the scheduling probability of the message has been determined in 302, then in 304, the method makes a decision based on the scheduling probability. More specifically, the method selects one of three options. First, the method can select inaction—that is, not to perform any scheduling action based on the message. Second, the method can select action, but with user approval—that is, to perform a scheduling action based on the message, but only after receiving confirmation from the user that the method should go ahead and perform the scheduling action. Third, the method can select automatic action—that is, to perform a scheduling action based on the message, automatically, without first receiving confirmation from the user.

In one embodiment of the invention, the method determines which of the three options to select based on probability thresholds associated with the boundaries among the three options. A first probability threshold is associated with the inaction |scheduling action with user approval boundary, and a second probability threshold is associated with the scheduling action with user approval| automatic scheduling boundary. If the scheduling probability is less than the first probability threshold, then the method selects inaction. If the scheduling probability is greater than the first probability threshold but less than the second probability threshold, then the method selects scheduling action with user approval. Finally, if the scheduling probability is greater than the second probability threshold, then the method selects automatic scheduling.

An example is illustrative in understanding the probability thresholds. For example, the first probability threshold can be 0.4, while the second probability threshold can be 0.7. If a message has a scheduling probability of 0.6, then the method selects scheduling action with user approval. In general, the inaction option relates to messages not having subject matter with high scheduling probabilities; the scheduling action with user approval option relates to messages having subject matter with medium scheduling probabilities; and, the automatic scheduling option relates to messages having subject matter with high scheduling probabilities.

The invention is not limited as to the manner by which the probability thresholds are determined. In one embodiment, they are user set. For example, with respect to the second probability threshold, the user may be suspicious of automatic scheduling, and thus not want automatic scheduling to occur unless the message being analyzed has a very high scheduling probability, say over 90%. Conversely, for example, a user becoming more accustomed and trusting of automatic scheduling may not want to be bothered with confirming suggested schedulings, and thus may set the second probability threshold to 70%, which means that messages having probability thresholds over 70% are automatically scheduled.

In other embodiments of the invention, the probability thresholds of the boundaries among the options that can be selected by the method are set in accordance with decision theory, such as utilizing cost/benefit analysis, both of which are known within the art, to provide for contextual and changing probability thresholds. This is described in more detail later in the detailed description.

Finally, in 306, the method performs a scheduling action based on the decision made in 304. That is, if automatic action was selected in 304, or if action with user approval was selected in 304 and actual user approval was received, then in 306 the scheduling action is performed. Conversely, if inaction was selected in 304, or if action with user approval was selected in 304 and actual user approval was not received, then in 306 no scheduling action is performed.

The scheduling action is performed in a manner balancing precision and confidence of the scheduling action. This can be generally described as follows. The method in 306 attempts to determine the most precise correct scheduling action it can, without crossing a line into determining a more precise incorrect scheduling action. For example, the method may only be able to determine that the message relates to a scheduling action for Thursday, but not know with confidence the exact time on Thursday the scheduling action relates. Thus, the method shows the user the entire calendar for Thursday—that is, it shows the user the most precise correct scheduling action it can, and not a more precise incorrect scheduling action (e.g., which would occur if the method shows the user a specific time for the scheduling action on Thursday). In other words, in 306, the method provides a graceful degradation of result, providing the user with an appropriate level of precision in the calendar view shown (a particular time slot, a particular day, a particular week, a particular month, etc.), in accordance with the level of confidence that the method has regarding the result.

The invention is not limited to the manner by which the scheduling action is performed in a manner balancing precision and confidence of the scheduling action. In one embodiment, performance is made in conjunction with a message understanding model for identifying times, dates, and appropriate scope of calendar operations from the text content of email messages (or other sources of text-such as text copied from a document—embodiments of the invention have the ability to take text from anywhere and schedule from it). The message understanding system converts the text of a message into dates and times. In such models, the output provided is used as the most precise correct scheduling answer that can be provided with confidence.

Figure 4:
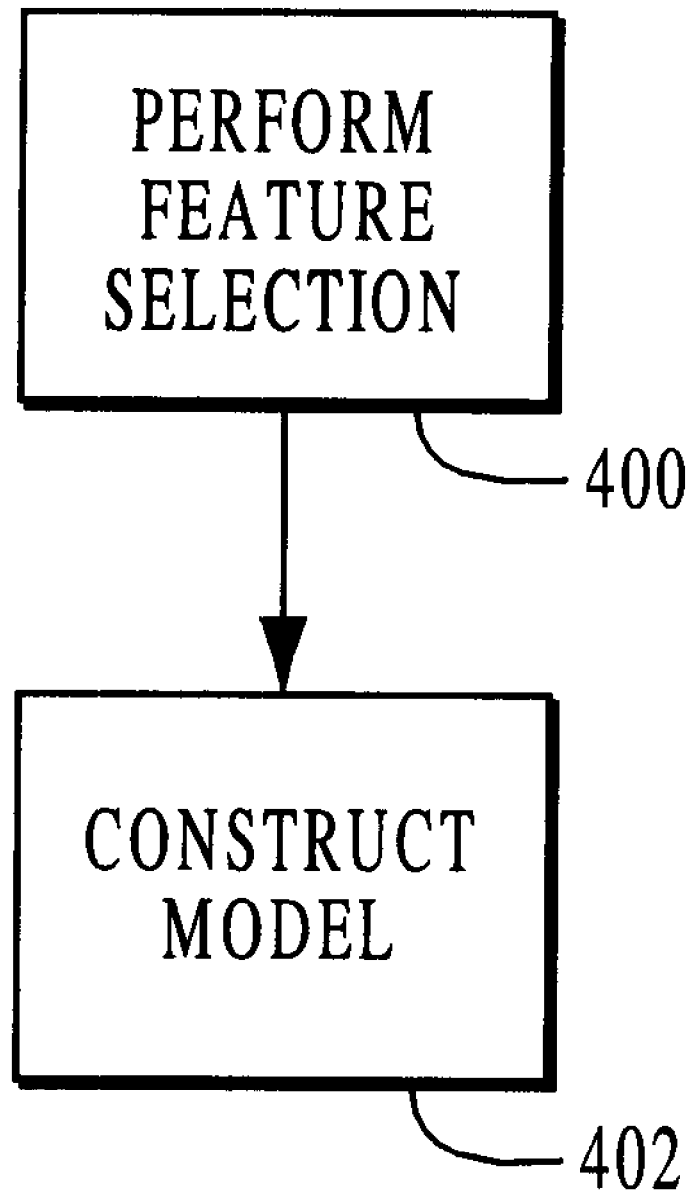
FIG. 4 is a flowchart of a method to construct a model utilized to determine a scheduling probability of a message, according to an embodiment of the invention.

Referring next to FIG. 4, a flowchart of a method to train a text classification system employing a Bayesian classifier or a support vector machine according to an embodiment of the invention, for use in determining a scheduling probability of a message, is shown. For example, the flowchart of FIG. 4 can be used to train a model that is used by 302 of FIG. 3 to determine a scheduling probability of a message. That is, the flowchart of FIG. 4 can be used to initially generate the model used by 302 of FIG. 3. As has been stated, text classification systems and the use of classification systems such as Bayesian classifiers and support vector machines are known within the art. Therefore, description of the method of FIG. 4 is specifically geared towards description of adaptation of such models for the applications used herein, as those of ordinary skill within the art can understand.

In 400, a feature selection phase is performed. Feature selection generally is known within the art. The feature selection phase is used to maximally discriminate between messages that should be scheduled, and messages that should not be scheduled. In one embodiment, this is accomplished by training the model. That is, a number of messages based on which scheduling is to occur (e.g., 500 messages) are input into the feature selection phase, such that the phase knows a priori that the messages are such that scheduling is to occur, and a number of messages based on which scheduling is not to occur (e.g., 500 messages) are input into the feature selection phase, such that the phase knows a priori that the messages are such that scheduling is not to occur. Thus, the model can then determine a maximum discrimination between those messages are scheduling related, and those messages that are not scheduling related. In addition, in one embodiment of the invention, feature selection occurs based on an initial seeding with domain-specific knowledge. Feature selection methods known in the art tend to explore a feature space of single words in the training corpus. We can enhance the power of classifiers by including multi-world phrases and high-level distinctions such as "the name of a day appears in the message" or "a time is mentioned" and Boolean combinations of words and high-level distinctions such as "a time is mentioned" and followed by the word "at".

The domain-specific knowledge can include words and phrases that typically are associated with scheduling-related messages, such as "get lunch," "let's meet," "get together," "this time" "lunch?", etc. A list of such words and phrases that are used in one embodiment of the invention is provided in conjunction with the next method described in this section of the detailed description. An example of such phrases supplied to feature selection methods is shown in FIG. 6, although the invention is not so limited. Those of ordinary skill within the art understand how such domain-specific knowledge can be used to seed feature selection to provide for maximum discrimination between scheduling-related and non-scheduling-related messages.

Next, in 402, once feature selection has been accomplished in 400, a model-construction phase is performed based on the feature selection. That is, a model, such as a text classification system, is built. Text classification systems are based on technologies for classifying objects based on attributes—these include Support Vector Machines, Bayesian networks, decision trees, and combinations thereof as known within the art, is constructed, based on the feature selection accomplished in 400. The construction of such systems and machines, and such models generally, is known within the art. Other information that the system can utilize is recent user activity.

In various embodiments, the text classification system can utilize the length of the message, dates and times recited in the message, the number of recipients of the message (sent to only one user, for example, or sent to a small group, or to a large group, etc.), the user's first name at the top of the message, and the use of future tense or past tense in the message, in parsing the message to determine a most precise correct scheduling action to perform, as those of ordinary skill within the art can understand.

Figure 5:
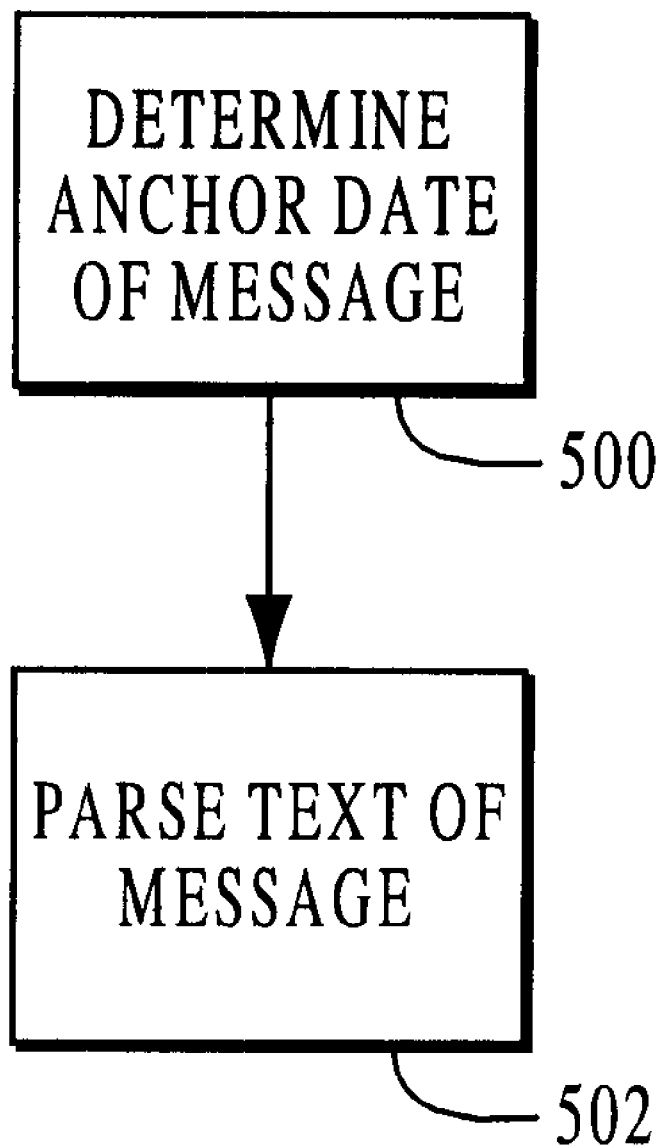
FIG. 5 is a flowchart of a method to perform a scheduling action according to an embodiment of the invention.

Referring next to FIG. 5, a flowchart of a method to perform a scheduling action according to an embodiment of the invention is shown. For example, the flowchart of FIG. 5 can be used to perform a scheduling action as accomplished by 306 of FIG. 3. The flowchart of FIG. 5 assumes a message understanding model, as known within the art, but a particular such model is not required by the invention.

In 500, the anchor date of the message is determined. This can be the date the message was composed by the sender of the message, the date the message was received by the recipient of the message, etc.; the invention is not so limited. In one embodiment, the reasoning is based on the composition date of the message, as this is the time on which the message sender has based his or her comments. Next, in 502, the text of the message is parsed relative to the anchor date, against the message understanding model utilized. More specifically, the message text is parsed against typical patterns and assumptions of commonsense language, as engrained in the message understanding model. Thus, desirably, reasoning is provided as to times associated with "tomorrow morning," "Friday afternoon," etc. In various embodiments, the text classification system as well as the message understanding model can utilize the length of the message, dates and times recited in the message, the number of recipients of the message (sent to only one user, for example, or sent to a small group, or to a large group, etc.), the user's first name at the top of the message, and the use of future tense or past tense in the message, in parsing the message to determine a most precise correct scheduling action to perform, as those of ordinary skill within the art can understand.

It is noted that in one embodiment, when target dates being referred to (that is, the date that is inferred from the message) have already passed, scheduling activities for these dates are suppressed if they fall in the past, at the time of reading a message. For example, if a user receives a message on Friday that refers to "getting together tomorrow" that was sent on Wednesday, the embodiment understands that this appointment is not relevant for scheduling or calendar review.

In one embodiment of the invention, the message understanding model takes into account special phrases in performing its parsing of the message text. Other embodiments of the invention can utilize a message understanding model having one or more of the following aspects, as can be appreciated by those of ordinary skill within the art:

Understanding of jargon such as today, tomorrow, next week, month, etc.

Commonsense table of default times and dates (for dinner, lunch, afternoon, evening, morning, , understanding whether user is referring to AM or PM when such distinctions are not indicated, interpreting "next Tuesday" depending on anchor day, etc.)

Control heuristics for searching for one or more implied dates—e.g., looking first in the original message, then in the subject of the current message, then in the body of the current message Use of dynamic scoping and graceful degradation, to scope precision of analysis appropriately for content and/or uncertainty, such as: if cannot schedule an appointment, just bring up the calendar; attempt an exact appointment (date and time), but degrade to the right day or the right week given uncertainty or indication of appropriate scoping Defaults for handling complete uncertainty: show the current day, or the current week Beliefs, Goals, and Actions In this section of the detailed description, information is provided about inferring beliefs about a user's goals, and determining automated actions to take based on a user's goals, that can be utilized in conjunction with embodiments of the invention. More specifically, description is provided as to how decision theory and cost-benefit analysis in particular can be utilized in conjunction with embodiments of the invention, as has been described.

A component of inferring beliefs about a user's intention is to develop models for assigning likelihoods to alternate user intentions. In the prior art, probabilistic models of a user's goals have been employed to continue to infer the probability of alternate feasible goals as a function of observables including the current program context, a user's sequence of actions, and choice of words used in a query. Also within the prior art, Bayesian network models have been utilized.

In one embodiment of the invention, a model that is used to make decisions about actions is a text classification system, such as a naïve Bayesian text classifier, a text classification system based on support vector machine analysis, and an efficient linear support vector machine approximation. In particular, these models are described in S. T. Dumais, J. Platt, D. Heckerman and M. Sahami, "Inductive Learning Algorithms and Representations for Text Categorization," Proceedings of ACM-CIKM98, November. 1998, which is hereby incorporated by reference, and in J. Pearl, Probabilistic Reasoning in Intelligent Systems: Networks of Plausible Inference, Morgan Kaufmann Publishers: San Francisco, 1991 (ISBN 1558604790), which is also hereby incorporated by reference. Furthermore, these models are described in the reference M. Sahami, S. Dumais, D. Heckerman, E. Horvitz, A Bayesian Approach to Junk E-Mail Filtering, AAAI Workshop on Text Classification, July 1998, Madison, Wisconsin, AAAI Technical Report WS-98-05, which is hereby incorporated by reference. Text-classification methods in particular are used for learning and reasoning reason about the likelihood of user goals within a context. For the context of a user reviewing electronic mail, for example, and the task of calendaring and scheduling, it is desirable to assign a likelihood that an electronic mail message that has just received the focus of attention is in the goal category of "User will wish to schedule or review a calendar for this electronic mail" versus the goal category of "User will not wish to schedule or review a calendar for this electronic mail" based on the content of the message. A linear support vector machine text classifier thus is built by training the system on a set of messages that are calendar relevant and calendar irrelevant, such that, at run-time, for each message being reviewed, the classifier outputs the likelihood that the user will wish to bring up a calendar or schedule an appointment.

Next, given the beliefs about a user's goal, a decision must be made as to whether an automated action should be taken. From the perspective of decision theory, decisions about action versus inaction are directed by expected value. Autonomous actions are only taken when they have greater expected value than inaction to the user, taking into consideration the costs, benefits, and uncertainties of a user's goal.

The probability of goals of a user given observed evidence can be written p(G|E). The probability that a user wishes to schedule is thus computed from evidence in patterns of text contained in a message that has been recently opened. For decisions about action versus inaction, there are four deterministic outcomes: either the user has the goal being considered or does not have the goal, and for each of these states of user intention, an action either is taken or note taken. A measure of the value associated with each outcome thus is mapped to a utility on a zero to one scale, such that the utilities are defined as follows:

u(A, G): the utility of taking action A when goal G is true u(A, not G): the utility of taking action A when goal G is not true u(not A, G): the utility of not taking action A when goal G is true, and u(not A, not G): the utility of not taking action A when goal G is not true The expected utility of taking autonomous action to assist the user with an action given observed evidence, u(A|E), is computed by combining the utilities of the outcomes for the case where the user desires service and does not desired a service, weighted by t probability of each outcome, as follows, $$u(A|E)=p(G|E)u(A, G)+p(\text{not}G|E)u(A, \text{not } G).$$

This equation can be rewritten in terms of p(G|E), by noting that p(G|E)=1−p(not G|E).
Thus, the expected utility of providing autonomous service is, $$u(A|E)=p(G|E)u(A|G)+[1-p(G|E)]u(A, \text{not } G).$$

The expected utility of not taking autonomous action to assist the user, u(not A|E) is, $$u(\text{not } A|E)=p(G|E)u(\text{not } A, G)+[1-p(G|E)]u(\text{not } A, \text{not } G).$$

The implications of these equations for the expected value of acting and not acting can be visualized, by plotting the lines they define, as shown in FIG. 6. Graph 600 of FIG. 6 is such that where the horizontal represents the probability the user has a goal, ranging from zero to one. The vertical axis indicates the expected value of the system's response.

The two outcomes displayed on the right vertical axis have a value associated with p(G|E)=1.0—the user indeed having the goal under consideration. The outcomes listed on the left vertical axis indicate the value of the outcomes when p(G|E)=0. The expected value of acting for intermediary probabilities of p(G|E) is a line joining the two deterministic outcomes associated with taking action. The expected value of not acting is a similar line joining the two outcomes associated with inaction.

It is noted that the lines cross at a specific probability of the user having a goal. At this threshold probability, referred to as p*, the expected value of action and inaction are equal. The best decision to make at any value of p(G|E) is the option associated with the greatest expected value at that likelihood of a user having the goal. Inspection of the graph 600 shows that it is better for the user to act if the probability of a goal is greater than p* and to refrain from acting if the probability is less than p*. The threshold probability for any four utilities can be computed by setting the above two equations equal to one another and solving for p(G|E). Given four values associated with the four outcomes of interest, a system need only to check whether the probability of the goal is greater or less than such a threshold probability to decide on whether it is in the best interest of the user to invoke a service.

Figure 7:
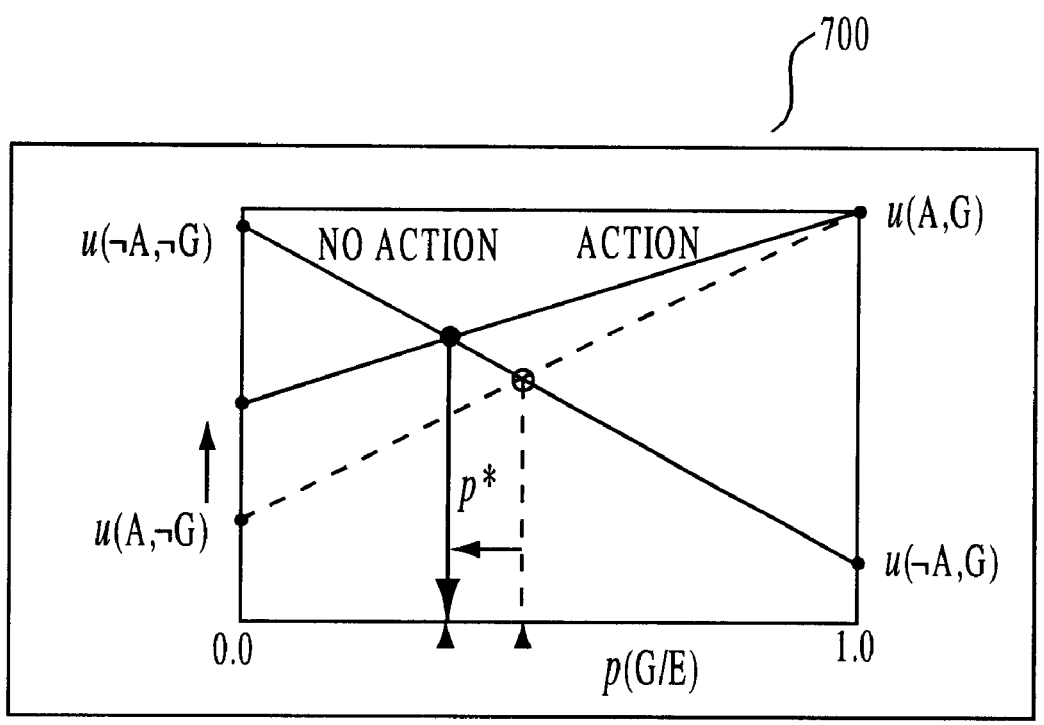
FIG. 7 is a graph in accordance with an application of decision theory that can be utilized in conjunction with embodiments of the invention.

It is also noted that the threshold probability, p*, can change dynamically as the value associated with one or more of the outcomes may be a function of the context. For example, the utility, u(A, not G), associated with the situation where a system takes action when a goal is not desired, may be greater where more screen real estate is made available. Increased screen real estate can diminish the perceived costs of the needless operation of a scheduling service that may bring up an appointment that obscures items at a user's focus of attention. FIG. 7 displays geometrically how the solution to p* can change when the utility u(A, not G) increases. As demonstrated in the graph 700 of FIG. 7, increasing the value (decreasing the cost) of acting erroneously leads to a lowering of the threshold probability that must be crossed before action occurs.

Figure 8:
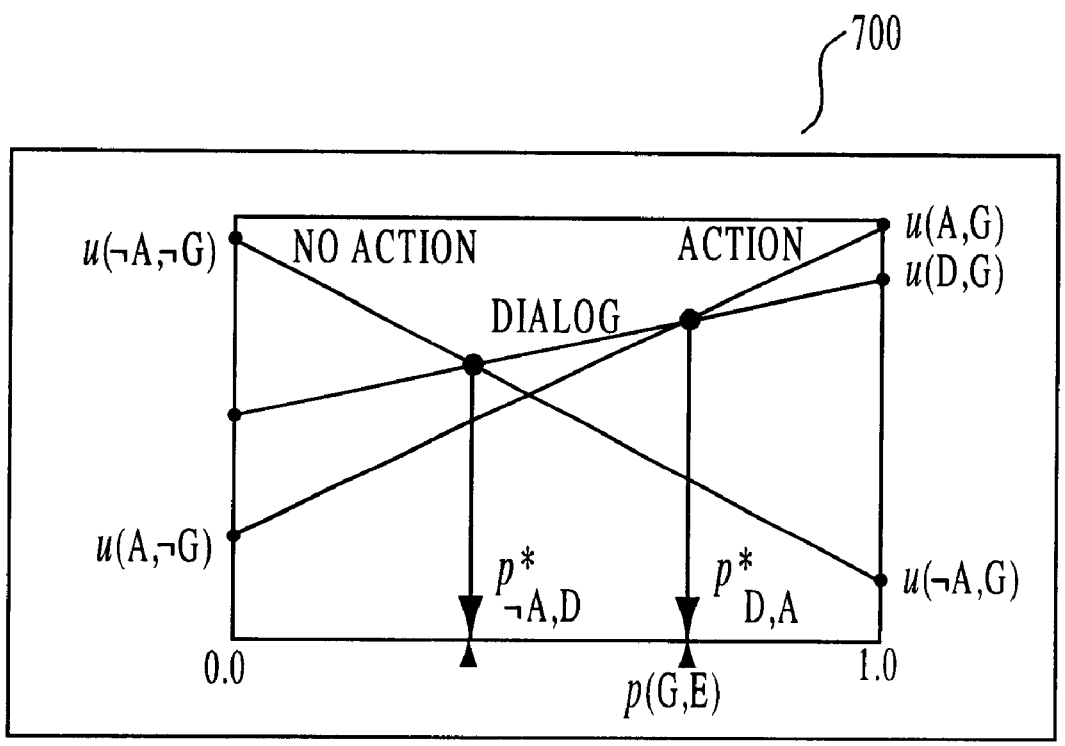
FIG. 8 is another graph in accordance with an application of decision theory that can be utilized in conjunction with embodiments of the invention; and, FIG. 9 is a diagram of a system according to an embodiment of the invention.
Figure 9:
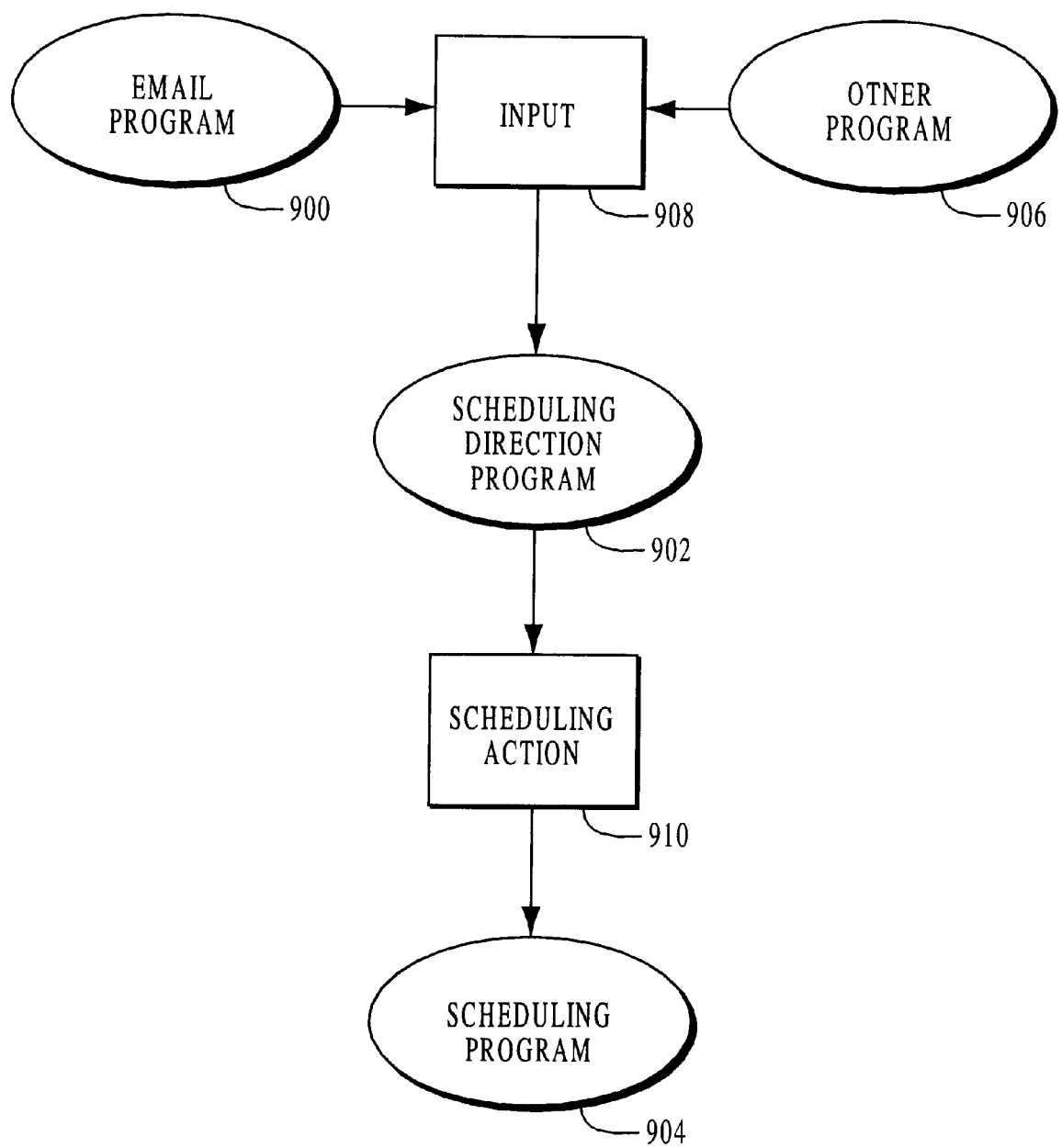

Beyond reasoning about whether to act or not to assist a user with an autonomous service, whether endowing an option of a system making a decision to ask the users about their goals is also considered. A way to integrate action for dialog into the expected utility framework is to consider the expected value of asking the user a question. Thus, the utility of these additional outcomes are considered: the case where initiate dialog about a goal and the user actually desires the goal under consideration, u(D, G), and the case where the user does not have the goal, u(D, not G). The result is shown in the graph 800 of FIG. 8, which shows the addition of a line representing the expected utility of engaging in a dialog.

As highlighted in the graph 800, the utility of engaging in a dialog with a user when the user does not have the goal in question is generally greater than the utility of performing an action when the goal is not desired. However, the utility of asking a user before performing a desired action is typically smaller than the utility of simply performing a desired action when the user indeed has the goal. In such circumstances, if the rule of selecting the option with the greatest expected utility is follow, then it is seen that action can be guided by two threshold probabilities. The two threshold probabilities are the threshold between inaction and dialog, $p^*_{notA, D}$, and the threshold between dialog and action, $p^*_{D, A}$. These two thresholds provide an instant index into whether to act, to engage the user in a dialog about action, or to do nothing, depending on the assessed likelihood of the user having a goal.

It is noted that explicit computations of expected value do not necessarily need to be performed; rather, thresholds can be directly assessed by designers or users. Such directly assessed thresholds on action imply a deeper assumed expected utility model, as those of ordinary skill within the art can appreciate.

System

In this section of the detailed description, a system according to an embodiment of the invention is described. The system includes an electronic mail program 900, a scheduling direction program 902, a scheduling program 904, and one or more other programs 906. In one embodiment, one or more of the programs 900, 902, 904 and 906 s a computer program executed by a processor of a computer (such as the computer described in conjunction with FIG. 1) from a computer-readable medium, such as a memory, of the computer. In one embodiment, the scheduling program 904 and the electronic mail program 900 are components of the same individual software program, as those of ordinary skill within the art can appreciate, although the invention is not so limited. The scheduling direction program 902 has an input 908, either from the electronic mail program 900, or one of the other programs 906. The scheduling direction program 902 provides a scheduling action 910 as an output, which is utilized by the scheduling program 904.

The electronic mail program 900 is a program in which a user is able to send and receive electronic mail messages, such that it provides as the input 908 to the scheduling direction program 902 a message—for example, the message currently having focus, as has been described. Alternatively, the input 908 to the scheduling direction program 902 can be a user-provided input, and/or an input as provided by one of the other programs 906—that is, the user has the ability to point at text from anywhere, beyond e-mail, and request the scheduling and calendar review service. In the former case, for example, the scheduling direction program can be user-invoked (as opposed to automatically or program-invoked), although the invention is not so limited. For example, the user has the ability to click a button on the mouse to invoke the service when desired (e.g., when the system does not come up on its own per probabilistic reasoning). Furthermore, the scheduling program 904 is a program in which a user is able to track appointments within a calendar, while the scheduling direction program 902 is a program in which appointments can be gleaned from the input 908 to be made in conjunction with the scheduling program 902.

In one embodiment, the user can move a mouse pointer to hover over an icon and view what the system would attempt to do if invoked (e.g., Meeting scheduled for 3 p.m. on Tuesday, etc.). Thus, the user can see what the system is thinking about the message before a service is invoked. When the system is running in a user-directed mode only, this is useful for seeing what the results of running the service would be.

Furthermore, in one particular embodiment, for the case of user-selected activity, a context-sensitive menu can be built that only includes options that are deemed as relevant. For example, "show calendar" may be displayed on the menu, rather than "schedule appointment," when the system is not able to come up with a precise time. The invention is not so limited, however.

In another embodiment of the invention, the system can be instructed to handle conflicts, multiple appointments, etc., when it comes up with an appointment that is already committed to another activity. For example, the system may indicate to the sender of a message that the recipient is busy at the initial suggested appointment time, and instead suggest an alternative new time for the appointment.

The scheduling direction program 902 first determines a scheduling probability based on the input 908. Based thereon, it selects one of the following three options: (1) inaction, (2) automatic action, and (3) suggested action with user approval. If either option (2) is selected, or option (3) is selected and the user has approved the suggested action, then the scheduling direction program 902 performs a scheduling action 910 within the scheduling program 904, in a manner balancing prevision and confidence of the scheduling action 910, as has been described. In one embodiment, the scheduling direction program 902 accomplishes this in accordance with the method previously described. However, the invention is not necessarily so limited.

In one embodiment, the system interacts with users through an agent mode, using an animated character and text-to-speech and speech recognition, or it can be put in a variety of non-agent modes that provide the services in a manner as has been described elsewhere herein. In one embodiment, when the system is used in agent mode, the value of the probability, within different ranges of threshold, is used to drive the language usage and gesture of the agent—for example, making the agent more humble and deferring when the probability is above but still close to a threshold, and more confident when the agent is more significantly above the threshold.

Conclusion

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

We claim:

1. A computer-implemented method comprising:
   determining a message to analyze;
   determining a probability that the message should be scheduled based at least in part on the message and contextual information;
   providing a selection option of at least one of: (1) inaction, (2) automatic action, and (3) suggested action with user approval; and
   performing a scheduling action based at least in part on the scheduling probability and a selected option, wherein selecting an option comprises:
   associating a boundary between the (1) and the (2) options with a first probability threshold, and a boundary between the (2) and the (3) options with a second probability threshold;
   upon determining that the scheduling probability is less than the first probability threshold, selecting the (1) option;
   upon determining that the scheduling probability is greater than the second probability threshold, selecting the (3) option; and, othewise, selecting the (2) option.

2. The method of claim 13, wherein suggested action with user approval comprises a dialog with the user about desirability of the automatic action.

3. The method of claim 13, wherein suggested action comprises seeking confirmation from the user to take action.

4. The method of claim 13, wherein scheduling probability comprises an inferred probability that the user has a goal of at least one of scheduling and reviewing calendar information.

5. The method of claim 13, wherein the contextual information comprises information regarding recent user activity.

6. The method of claim 13, wherein determining a message to analyze comprises determining a message having focus.

7. The method of claim 13, wherein determining the scheduling probability based on the message comprises inputting the message into a text classification system.

8. The method of claim 7, wherein inputting the message into a text classification system comprises initially generating the text classification system.

9. The method of claim 8, wherein initially generating the text classification system comprises;
performing a feature-selection phase; and
performing a model-construction phase based on the feature-selection phase.

10. The method of claim 9, wherein performing a feature-selecting phase comprises training the text classification system by inputting a plurality of messages based on which scheduling is to occur and inputting a plurality of messages based on which scheduling is not to occur.

11. The method of claim 9, wherein performing a feature-selection phase comprises seeding the feature-selection phase with domain-specific knowledge.

12. The method of claim 11, wherein the domain-specific knowledge comprises at least one of: multiword phrases, nature of a relationship between a sender and a receiver, a number of recipient of the message, and Boolean combinations of variables composed by joining multiword phrases with at least one of a date variable and a tie variable.

13. The method of claim 1, wherein associating a boundary between the (1) and the (2) options with a first probability threshold, and a boundary between the (2) and the (3) options with a second probability threshold comprises utilizing decision theory to determine the first and the second probability thresholds.

14. The method of claim 13, wherein utilizing decision theory comprises utilizing cost/benefit analysis.

15. The method of claim 14, wherein utilizing cost/benefit analysis comprises utilizing the cost/benefit analysis in a contextual manner.

16. The method of claim 1, wherein performing a scheduling action comprises:
determining an anchor date of the message; and,
parsing a text of the message relative to the anchor date against typical commonsense patterns and assumptions of typical language usage.

17. A machine-readable medium having processor instructions stored thereon for execution by a processor to cause performance of a method comprising:
determining a message to analyze;
determining a probability that the message should be scheduled;
providing a selection option of at least one of: (1) inaction, (2) automatic action, and (3) suggested action with user approval; and
performing a scheduling action based at least in part on the scheduling probability and a selected option, wherein selecting an option comprises:
associating a boundary between the (1) and the (2) options with a first probability threshold, and a boundary between the (2) and the (3) options with a second probability threshold;
upon determining that the scheduling probability is less than the first probability threshold, selecting the (1) option;
upon determining that the scheduling probability is greater than the second probability threshold, selecting the (3) option; and,
otherwise, selecting the (2) option.

18. The medium of claim 17, wherein determining a message to analyze comprises determining a message having focus.

19. The medium of claim 17, wherein determining the scheduling probability comprises inputting the message into a text classification system.

20. The medium of claim 19, wherein inputting the message into a text classification system comprises initially generating the text classification system.

21. The medium of claim 20, wherein initially generating the text classification system comprises:
performing a feature-selection phase; and,
performing a model-construction phase based on the feature-selection phase.

22. The medium of claim 21, wherein performing a feature-selecting phase comprises training the text classification system by inputting a plurality of messages based on which scheduling is to occur and inputting a plurality of messages based on which scheduling is not to occur.

23. The medium of claim 21, wherein performing a feature-selection phase comprises seeding the feature-selection phase with domain-specific knowledge.

24. The medium of claim 17, wherein associating a boundary between the (1) and the (2) options with a first probability threshold, and a boundary between the (2) and the (3) options with a second probability threshold comprises utilizing decision theory to determine the first and the second probability thresholds.

25. The medium of claim 24, wherein utilizing decision theory composes utilizing cost/benefit analysis.

26. The medium of claim 25, wherein utilizing cost/benefit analysis comprises utilizing the cost/benefit analysis in a contextual manner.

27. The medium of claim 25, wherein performing a scheduling action comprises:
determining an anchor date of the message; and,
parsing a text of the message relative to the anchor date against typical patterns and assumptions of commonsense language.

28. A scheduling system, comprising:
a message with associated content;
an analyzing component that determines a probability that the message should be scheduled based on the message content; and
a scheduling component that configures a schedule based on the scheduling probability.

29. A scheduling system, comprising:
a message with associated content;
an analyzing component that determines a probability that the message should be scheduled based on the message content; and
a scheduling component that configures a schedule based On the scheduling probability,
the analyzing component employing the following equation in determining the scheduling probability:

$$u(A|E)=p(G|E)u(A,G)+[1-p(G|E)]u(A, \text{not } G),$$

u(A|E) is an expected utility of taking an autonomous action (A) given observed evidence (E);

p(G|E) is a probability of goal (G) of a user given observed evidence (E);

u(A,G) is an expected utility of taking an autonomous action (A) when goal (G) of the user is true; and u(A, not G) is an expected utility of talking an autonomous action (A) when goal (G) of the user is not true.

30. The system of claim 28, the analyzing component is a text classifier.

31. The system of claim 28, the scheduling component is an electronic calendar adapted to configure the schedule based on the scheduling probability being above a threshold.

32. The system of claim 28, further comprising a user interface to provide at least one of the following scheduling options: inaction, automatic action, and suggested action with user approval, based on the scheduling probability.

* * * * *

UNITED STATES PATENT AND TRADEMARK OFFICE
CERTIFICATE OF CORRECTION

PATENT NO.    : 6,505,167 B1
DATED         : January 7, 2003
INVENTOR(S)   : Eric Horvitz et al.

It is certified that error appears in the above-identified patent and that said Letters Patent is hereby corrected as shown below:

<u>Title page,</u>
Item [73], Assignee, please change "Microsoft Corp." to -- Microsoft Corportion --

Signed and Sealed this

Thirteenth Day of January, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,505,167 B1
DATED : January 7, 2003
INVENTOR(S) : Eric Horvitz et al.

It is certified that error appears in the above-identified patent and that said Letters Patent is hereby corrected as shown below:

<u>Title page,</u>
Item [73], Assignee, please change from "Microsoft Corportion" to
-- Microsoft Corporation --.

Signed and Sealed this

Twentieth Day of April, 2004

JON W. DUDAS
*Acting Director of the United States Patent and Trademark Office*